United States Patent [19]

Liu et al.

[11] Patent Number: 5,176,723

[45] Date of Patent: Jan. 5, 1993

[54] CONDENSATION-GROWTH PARTICLE SCRUBBER

[75] Inventors: Benjamin Y. H. Liu, North Oaks; Peter H. McMurry, Minneapolis; Jinjun Sun, St. Paul, all of Minn.

[73] Assignee: Regents of the University of Minnesota, Minneapolis, Minn.

[21] Appl. No.: 732,633

[22] Filed: Jul. 19, 1991

[51] Int. Cl.$^5$ .................. B01D 47/06; B01D 47/12
[52] U.S. Cl. .......................... 55/90; 55/94; 55/222; 55/223; 55/257.2; 55/257.7; 55/258; 55/268
[58] Field of Search ............ 55/1, 90, 93, 94, 222, 55/223, 237, 257.2, 257.3, 257.7, 258, 267-269

[56] References Cited

U.S. PATENT DOCUMENTS

| | | | |
|---|---|---|---|
| 3,755,990 | 9/1973 | Hardison | 55/93 |
| 3,773,472 | 11/1973 | Hausberg et al. | 23/283 |
| 3,800,505 | 4/1974 | Tarves, Jr. | 55/93 X |
| 3,852,409 | 12/1974 | Martin et al. | 423/242 |
| 3,906,078 | 9/1975 | Hausberg et al. | 423/242 |
| 3,912,469 | 10/1975 | Ewan et al. | 55/238 |
| 3,957,464 | 5/1976 | Teller | 55/94 X |
| 4,141,701 | 2/1979 | Ewan et al. | 55/90 |
| 4,272,499 | 6/1981 | Cason et al. | 55/223 X |
| 4,345,916 | 8/1982 | Richards et al. | 55/94 X |
| 4,364,750 | 12/1982 | Koncz | 55/94 X |
| 4,695,298 | 9/1987 | Dries | 55/94 X |
| 4,735,636 | 4/1988 | Roberts | 55/93 X |
| 4,799,941 | 1/1989 | Westermark | 55/222 X |
| 4,886,523 | 12/1989 | Maldague | 55/1 |
| 4,964,885 | 10/1990 | Wieser-Linhart | 55/94 X |
| 5,039,315 | 8/1991 | Liao et al. | 55/90 |

OTHER PUBLICATIONS

Tetsuo Yoshida, Journal of Chemical Engineering, vol. 2, No. 6, 1978, *Application of Particle Enlargement By Condensation to Industrial Dust Collection.*
Bulletin 55B Otto H. York Co. Inc., Published 1990—Utilization of Hydro-Sonic Scrubbers for Abatement of Emissions from Hazardous/Low Level Radioactive Mixed Wastes. pp. 1–12.
Brochure by J. D. Means, Ph.D et al. Utilization of Hydro-Sonic Scrubbers for Abatement of Emissions from Hazardous/Low Level Radioactive Mixed Wastes Apr. 22, 1986. pp. 2–16.

*Primary Examiner*—Robert Spitzer
*Attorney, Agent, or Firm*—Kinney & Lange

[57] ABSTRACT

A particle removal system provides for the removal of submicron particles in gas streams, such as combustion flue gases or diesel exhausts. The gas stream is treated to permit very fine particles to coagulate through a short residence time in the conduits handling the gas stream, and thereafter is conditioned to establish saturation of the gas stream at a low temperature, such as by water injection. The saturated stream of gas containing the particles is then passed through a particle growth chamber or section where steam is injected into the gas to establish a supersaturation condition, causing the particles in the gas stream to grow in size by water condensing around the particles. The particles are grown to a size that is near one micron, and are removed through conventional particulate removal devices.

15 Claims, 9 Drawing Sheets

CONDENSATION-GROWTH PARTICLE SCRUBBER

BACKGROUND OF THE INVENTION

The present invention relates to a condensation-growth particle scrubber in which submicron particles are grown or enlarged in size by injecting steam into a low temperature saturated gas stream carrying the submicron particles. The injection of steam causes supersaturation of the gas stream. Condensation forms on the small particles so that they grow in size and can be removed by conventional particle removal equipment.

Pollution control devices that have been developed for removing particulate and gaseous contaminants from combustion flue gas streams and from diesel exhaust have included filters, electrostatic precipitators, scrubbers, cyclones, and mist removal devices such as those sold under the trademark DEMISTER by the Otto H. York Co., Inc. of Parsippany, N.J. Most of these devices will remove particles that are greater than one micron in transverse dimension, and while some devices, such as filters, will remove smaller particles, the efficiency becomes quite low, or the pressure drop becomes quite high, as the smaller particles are removed. Further, baghouse filters cannot be used with high temperature gas streams or with moisture laden flows because the fabric will be destroyed or become clogged.

Electrostatic precipitators are used quite widely to remove particles by first imparting an electrical charge to the particles, and then removing the particles in an electric field. Costs of operation are quite high, and electrostatic precipitators are not compatible with certain types of dusts, such as those that have high resistivity. Particle reentrainment, poor gas flow, complexity of control systems and like are problems encountered when using electrostatic precipitators. These precipitators do not remove gaseous contaminants.

Scrubbers are often used to remove particulate and gaseous contaminants from combustion flue gas streams, and have the advantages of simultaneously absorbing gases and removing particulate matter. They can be used in high temperature, high moisture, and high dust environments, with a low initial capital cost. The removal efficiency of scrubbers depends heavily on the size of the particles, and most scrubbers are not capable of removing particles smaller than one-half a micron.

Some scrubbers use steam or compressed air to atomize water in the flue gas stream to cause agglomeration with the atomized water droplets under intense turbulent flow mixing conditions. These scrubbers have relatively high efficiency for removing submicron particles, but also consume high amounts of energy. One such device is referred to as the "hydrosonic" scrubber. These scrubbers are limited to small scale installations or specialized applications, such as those for incineration of hazardous, toxic, or radioactive wastes.

Cyclones are normally used to remove particles larger than a few microns in diameter, and mist eliminators are used primarily for removing liquid particles. High efficiency cyclones and mist eliminators are capable of removing particles as small as one micron, but they generally have a high pressure drop and high energy consumption for particles that small and smaller. This makes operation costs high since operation is inefficient.

In the patented prior art, condensational growth of particles has been known. Hausberg et al. U.S. Pat. Nos. 3,773,472 and 3,906,078, as well as Richards et al. U.S. Pat. No. 4,345,916 disclose adiabatic cooling to achieve vapor supersaturation, and using that as a way of causing particle growth to permit removal of the particles from the aerosol.

Hardison U.S. Pat. No. 3,755,990 mixes a hot gaseous effluent having a high percentage of submicron particles with a hot saturated gas stream, which is then subjected to rapid cooling, such as by diluting with cool air, so as to cause condensation of water on the particles.

Carson et al. U.S. Pat. No. 4,272,499, Martin et al. U.S. Pat. No. 3,852,409, and Ewan et al. U.S. Pat. Nos. 3,912,469 and 4,141,701, use processes which include passing a carrier gas through a turbulent free jet emitted from a subsonic nozzle and containing a large number of small high velocity liquid droplets atomized by steam, or other gases, to promote droplet growth by agglomeration with particles and other droplets. The droplets then can be removed by a specially designed cyclone. Particle collection in these devices is accomplished by agglomeration, rather than condensation of steam on the particles.

The present invention involves a process that reduces overall expense of operation, and maintains high efficiency.

SUMMARY OF THE INVENTION

The present invention relates to a method and apparatus for causing growth of submicron particles by causing water vapor to condense on the particles. The growth occurs after the gas stream has been cooled and treated to reach a saturated state, after which steam is injected into the gas stream to supersaturate the gas stream. The supersaturated water vapor will condense as free water on the particles. The resulting larger particles (after condensation growth) then can be separated from the gas stream using conventional devices and, in some instances, after modifying such separation devices to permit the collection of solid particles encapsulated by liquid droplets. Usable particle separation devices are high efficiency mist eliminators, Venturi scrubbers, or impactors, as well as other known devices.

The gas stream to be treated may be a flue gas or exhaust gas from an internal combustion engine such as from a diesel engine. If desired, the apparatus includes a path that permits small particles to agglomerate, after which the gas stream is cooled, either by passing the gas through a heat exchanger to generate steam that can be used later in the process, or the gas can be cooled by other means. The gas stream is preferably passed through a conventional cyclone to remove large particles with a relatively low pressure drop as well. The gas stream is conditioned to establish saturation of the gas at a relatively low temperature, for example, in the range of under 140° F. This conditioning can be done in a number of ways, including water injection, also using existing equipment and techniques. The gas stream is kept at a saturated state.

The saturated gas stream is then treated by injecting steam into the cool gas stream, which causes supersaturation of the gas stream. In a supersaturated state, the excess water in vapor form must condense to form droplets. In the presence of small suspended particles in the gas, condensation will take place on the particle surface, causing the submicron particles to grow to micron or larger size droplets.

Subsequent to the treatment by injecting steam to create supersaturation, the particles can be separated out in a number of different ways including mist eliminators, cyclones, venturi scrubbers, or impactors that separate out particles.

By treating the gas stream in a manner to bring it to saturation point at a low temperature prior to the injection of steam to cause particle growth, superior results are obtained.

BRIEF DESCRIPTION OF THE DRAWINGS

FIG. 8 is a representation of flow in a steam conditioner used with the device in FIG. 5.

DETAILED DESCRIPTION OF THE PREFERRED EMBODIMENTS

Figure 1:
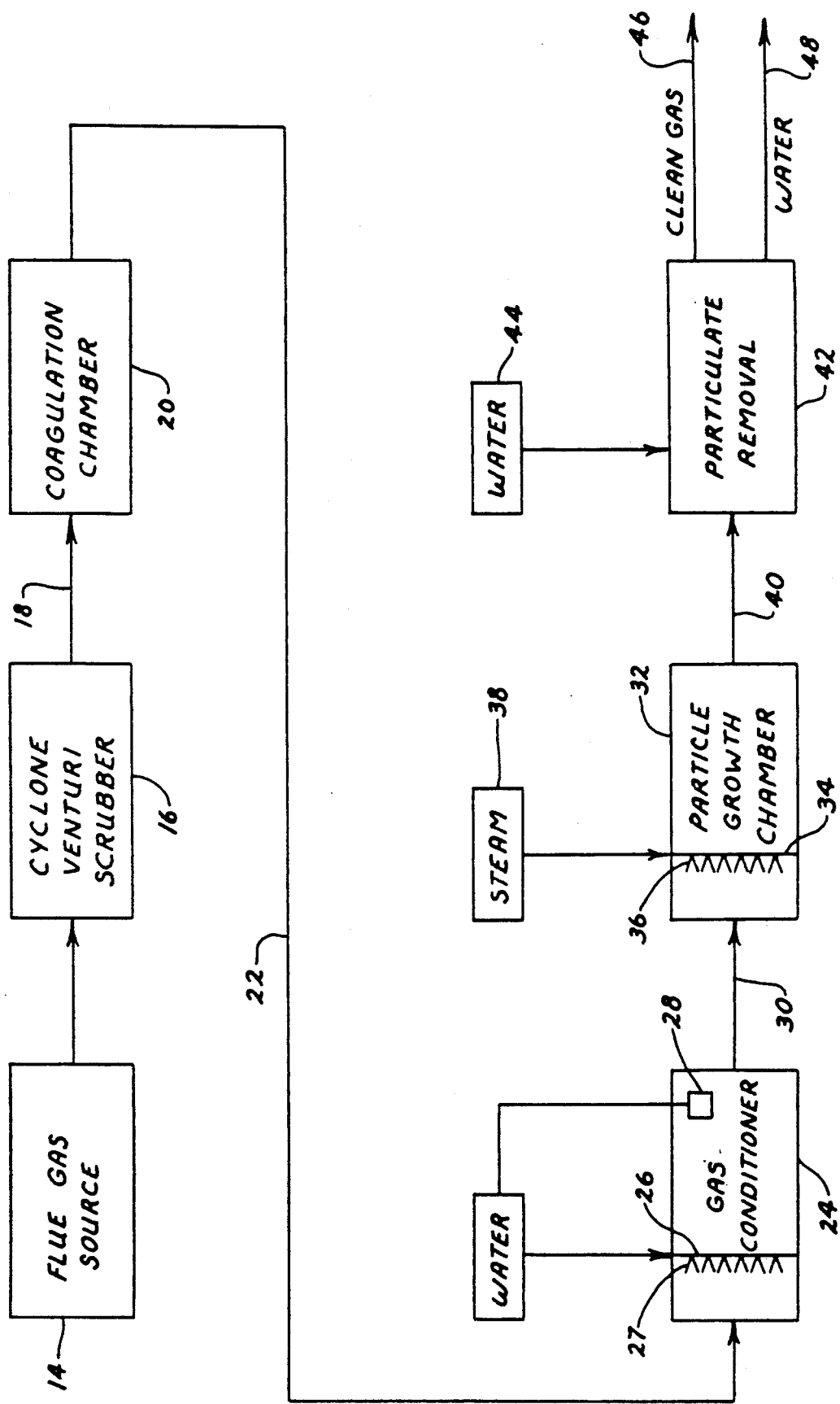
FIG. 1 is a block diagram representation of a condensation-growth particle scrubbing method and apparatus made according to the present invention.
Figure 4:
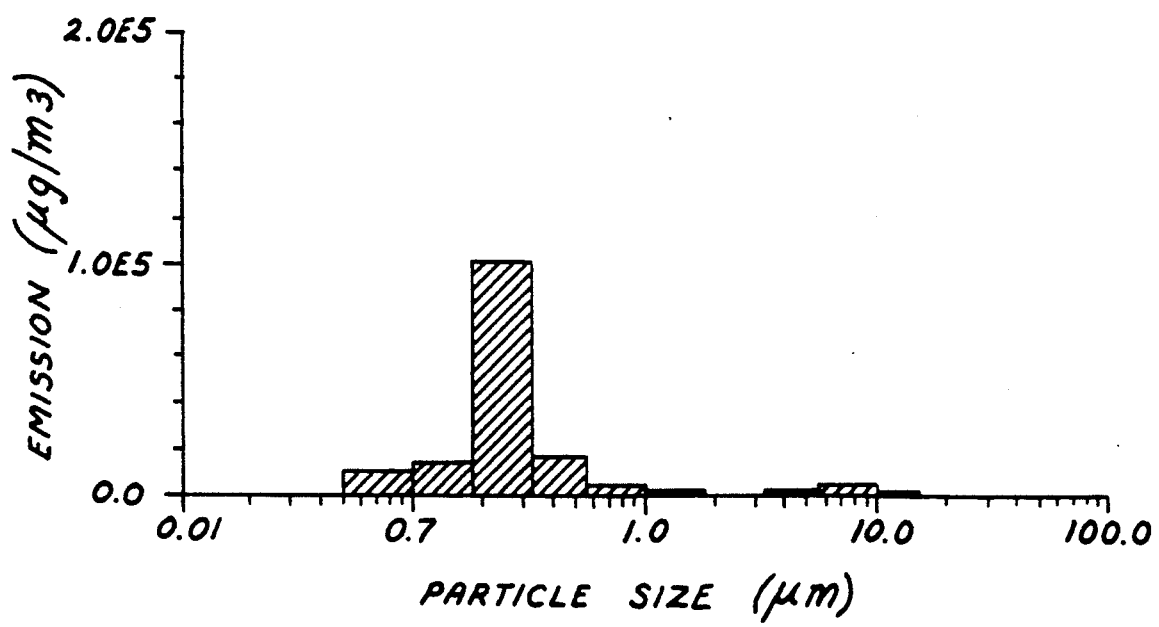
FIG. 4 is a graphical representation of a typical particle size distribution from a typical flue gas.

FIG. 1 illustrates in a block diagram form flue gas cleaning system made according to the present invention for removing submicron particles at high efficiency, while minimizing the energy consumption needed to operate the system. A typical flue gas may be coming from a waste water combustion plant where sewage solids are incinerated. The flue gas contains particles that range in size, and a typical distribution of particle sizes that are measured downstream of a conventional cyclone or a venturi scrubber in the stack of a typical municipal wastewater combustion plant, is illustrated in FIG. 4. Most of the particle mass falls between the 0.1 to 1.0 micron diameter range. Particles of this size are too small to be captured by conventional scrubbers or cyclones. As stated previously, electrostatic precipitators and filters can be used, but the problems associated therewith make the cost of operation high, as well as having other operational limits.

Referring to FIG. 1, a schematic flow chart of the present invention is illustrated. A flue gas source indicated generally at 14, such as a wastewater combustion plant provides an output flue gas from a stack which is passed through conventional cyclones or venturi scrubbers indicated generally at 16. The smaller particles in the gas stream carried by an output line 18 of the venturi scrubber or cyclone in this form of the invention are provided to a coagulation chamber 20, which comprises a series of ducts that causes high particle concentrations of small individual particles to coagulate together to reduce the total number of particles and to eliminate ultra fine particles. This coagulation chamber 20 can be any system component that provides sufficient residence time (a few seconds) for the particles to coagulate. Components that serve effectively as a coagulation chamber include duct work, a cyclone, or a chamber that is included specifically for providing adequate coagulation time. The coagulation chamber, thus, could be an additional cyclone for permitting coagulation, or a length of duct that keeps the flue gas flowing and the particles in association with each other for a few seconds.

The coagulation chamber output line 22 carrying the gas stream and particles leads to a gas conditioner 24. The gas conditioner 24 will be more fully explained, but it includes a chamber or housing through which the flue gas passes. A spray head 26 is on the interior of the chamber and includes a number of nozzles indicated schematically at 27, provide for water injection for cooling the gas. Other conventional methods to establish saturation of the flue gas while lowering the temperature of the flue gas to the range of 90–120° F. also can be used. Thus, the gas conditioner is a chamber that permits lowering the temperature of the flue gases or gas stream, and bringing the water vapor content of the gas to saturation point. The water injection can be controlled by utilizing suitable sensors indicated at 28 to sense the saturation level of the flue gases before the flue gases exit through a conduit 30 to a steam injection or particle growth chamber indicated at 32. The chamber 32 is provided with a steam nozzle array 34. Nozzle array 3 is a pipe having a number of individual nozzles 36 thereon, that leads from a source of steam indicated at 38. The steam injected is at a high temperature into this chamber and, since the flue gas in conduit 30 entering the particle growth chamber 32 is at saturation level, condensation occurs on cooler particles when the steam is injected to bring the flue gas to a supersaturated point. This condensation will cause growth of the individual particles in the gas stream, with each of the particles becoming a nucleus for a new particle of solid and liquid matter.

The supersaturated flue gas, including the particles that have been grown in size, pass through a conduit 40 to a particulate removal device indicated at 42. Such a particulate removal device is a conventional gaseous contaminant remover if desired, such as a mist eliminator sold under the trademark DEMISTER or a venturi scrubber, an impactor, or similar separator that efficiently removes particulate matter. If desired, water can be injected into the particulate removal device from a water source 44.

Clean gas is thus discharged along a conduit 46, and water carrying particulate materials is discharged along the conduit 48 for disposal. The arrangement of FIG. 1 has the advantages of lowering the temperature of the flue gas. A low flue gas temperature will result in smaller amounts of water vapor that must be added to cause a given degree of supersaturation, thereby reducing steam consumption, and the cost of operating the condensation-growth scrubber.

Very small particles, that is less than 0.1 microns, will not grow if the local supersaturation is not sufficiently high. For example, an average supersaturation of 25% can be established by adiabatically expanding a saturated aerosol at 140° F. through a converging venturi operating at a mach number of 0.27 which requires very high energy consumption. In such a case, immediately after expansion, if a particle temperature is a few degrees Fahrenheit lower than its temperature before cooling, but still six to eight degrees higher than the temperature of the carrier gas in the aerosol after cooling, the supersaturation established at the surface of the particles is less than 3%. It can be shown that particles smaller than about 0.1 microns will not grow for supersaturations less than 3%.

In the present invention, the disadvantages are overcome by creating supersaturation using steam injection. The steam can be generated by a waste heat recovery boiler, and no additional fuel would be required. In the case of supersaturation created by adiabatic expansion in a Venturi nozzle, the energy input is in the form of electrical energy to operate the fan for maintaining the gas flow through the Venturi. The cost of operating such condensation growth scrubber is economic only if the cost of the energy is not too high. In the present case, when steam generated by waste heat recovery is used to create the supersaturation, the costs can be reduced.

Preferably, the present invention includes a gas conditioner in which cold water will be sprayed to cool the flue gases to the low temperature saturation state before steam injection. It is calculated that at a given rate of steam injection, the lower the flue gas temperature, the higher the supersaturation that can be established. For example, injection of steam at 212° F. at a rate of 0.08 lbs. of steam/lb. of gas to the flue gas initially saturated at 200° F. leads to a supersaturation of less than four percent. At the same steam injection rate, if the flue gas is initially saturated at 140° F., a supersaturation of 22% can be established. If the flue gas is initially saturated at 80° F., a supersaturation as high as 300% can be created with the same steam injection rate. Calculations also show that the amounts of injected steam that condenses on particles for a flue gas initially saturated at 180° F., 140° F. and 100° F. are less than four percent, about 25% and about 40% respectively. Thus, the step of conditioning the gas to bring it to a saturated state at a temperature less than 140° F. and preferably below 100° F. is an important step in the process.

However, the supersaturation of the gas established or created by injection of steam is selected so that it is not high enough for homogeneous nucleation to occur, which usually requires a saturation ratio in excess of 200% to 1,000%. The water vapor in the mixture, after injection of steam, will condense on the particles in order to restore thermal equilibrium. Calculation shows that about 30% of the injected steam can condense onto particles when the flue gas is initially saturated at 100° to 130° F. The rate of steam injection is selected such that the particles will grow with condensation to a relatively large size, that is, greater than one micron. These large droplets can be removed very efficiently with conventional particle removal devices at low cost. This makes the total energy required using the present invention for particle removal to be lower than previous devices.

Figure 2:
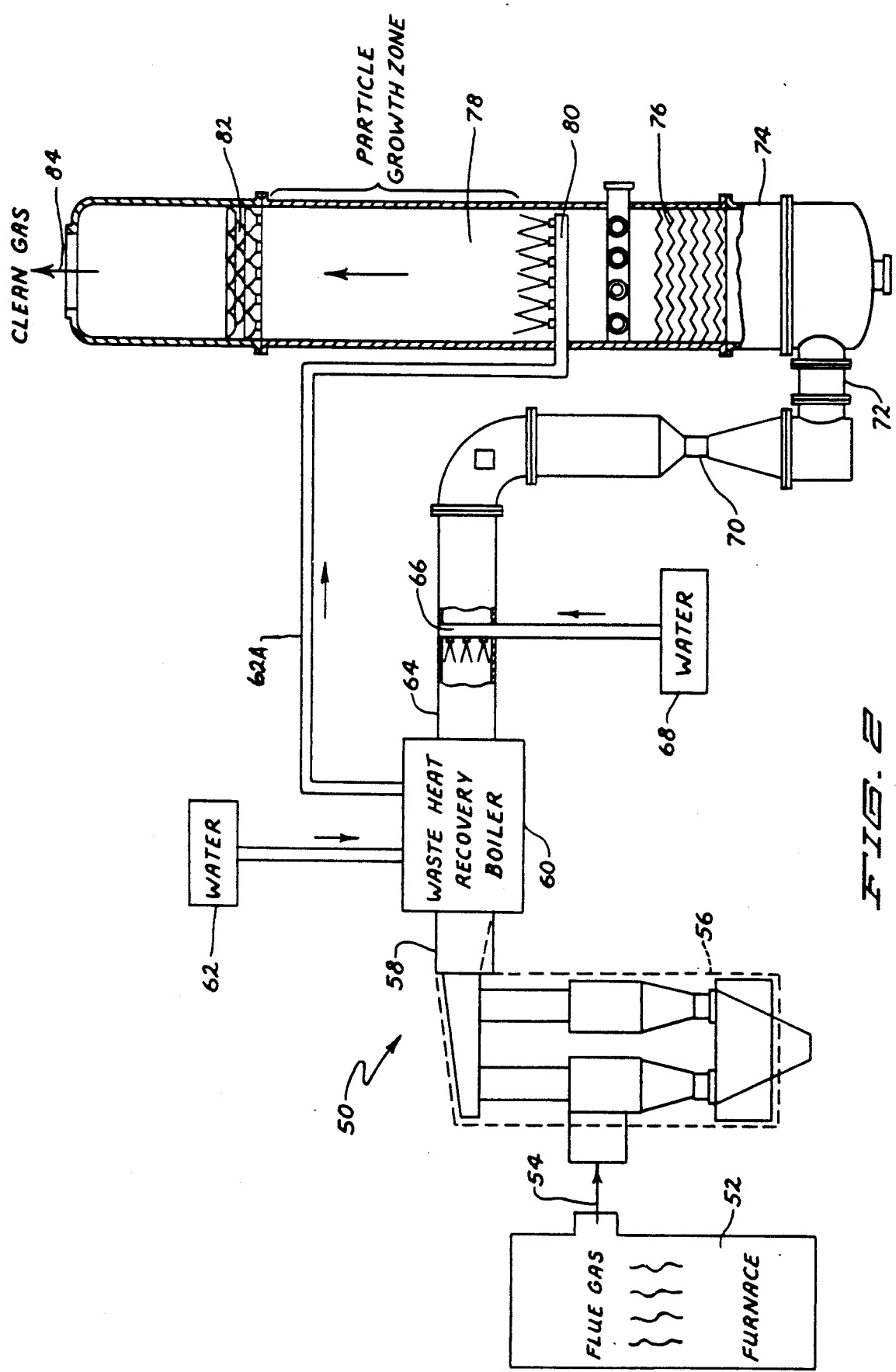
FIG. 2 is a schematic representation of a more detailed preferred embodiment of the present invention relating to treatment of a flue gas.

Referring specifically to FIG. 2, a condensation growth particle scrubber made according to the present invention is illustrated generally at 50, and schematically shows a furnace 52 providing a flue gas through a stack 54. This flue gas is passed into a conventional cyclone 56 for separation of large particles. The conventional cyclone 56 separates out large particles at a relatively low pressure loss, through conventional separation techniques. The flue gas remains hot as it passes through this cyclone, which acts as a coagulation chamber. The output side of the cyclone empties into a chamber 58 that receives the flue gas. The cyclone 56 has sufficient passageway to permit small particles to agglomerate prior to entry into a waste heat recovery boiler 60. The boiler 60 is a conventional unit that has a water source 62 connected to pipes in the boiler, while the flue gases circulate around the pipes and convert the water into steam in a normal process. The steam is carried through a steam conduit 62A.

In this form of the invention, the output conduit 64 from the waste heat recovery boiler 60 has a sufficient length and is of size to handle the aerosol comprising the flue gas with the agglomerated particles, and at a temperature that is cooled from the original temperature due to the heat exchange that takes place in the waste heat recovery boiler 60. The conduit 64 comprises a gas conditioner where the temperature of the aerosol is reduced. A water spray bar indicated schematically at 66 is provided in conduit 64 to introduce water into the aerosol from a water source 68 to saturate the aerosol, comprising the flue gas stream and particles.

In this form of the invention, a conventional venturi scrubber 70 is provided at the output end of the conduit 64 to cause further cooling of the gas as the gas exits the venturi. In this form of the invention, the gases exiting the venturi 70 will have temperatures in the range of 90° F. to 120° F. (less than 140° F.).

The agglomeration of particles in cyclone separator 56 can reduce particle number concentrations substantially and removes up to about 50% of the particulate mass with a negligible pressure drop. The venturi scrubber 70 removes 95% to 99% of the remaining particle mass, and the gases exiting the venturi are saturated.

The outlet of the venturi scrubber leads through a conduit 72 into a particle separation housing 74 that comprises a demisting assembly having a layer of packing 76 through which the gases pass. The walls define a particle growth chamber 78. A steam injection nozzle set 80 is provided on the interior of the chamber 78 to supersaturate the gas stream as it flows upwardly through a high efficiency or mist eliminator 82 of the type made by Otto H. York Co., Inc., and sold under the trademark "York-Fiberbed".

In the particle growth zone or chamber 78, the supersaturated gas, (due to the injection of steam) will condense out on the submicron particles and as the flow passes through the high efficiency mist eliminator, these particles that have been grown into the range of one micron or so, will be removed easily. The clean gas will exit, as indicated by the arrow 84.

Figure 3:
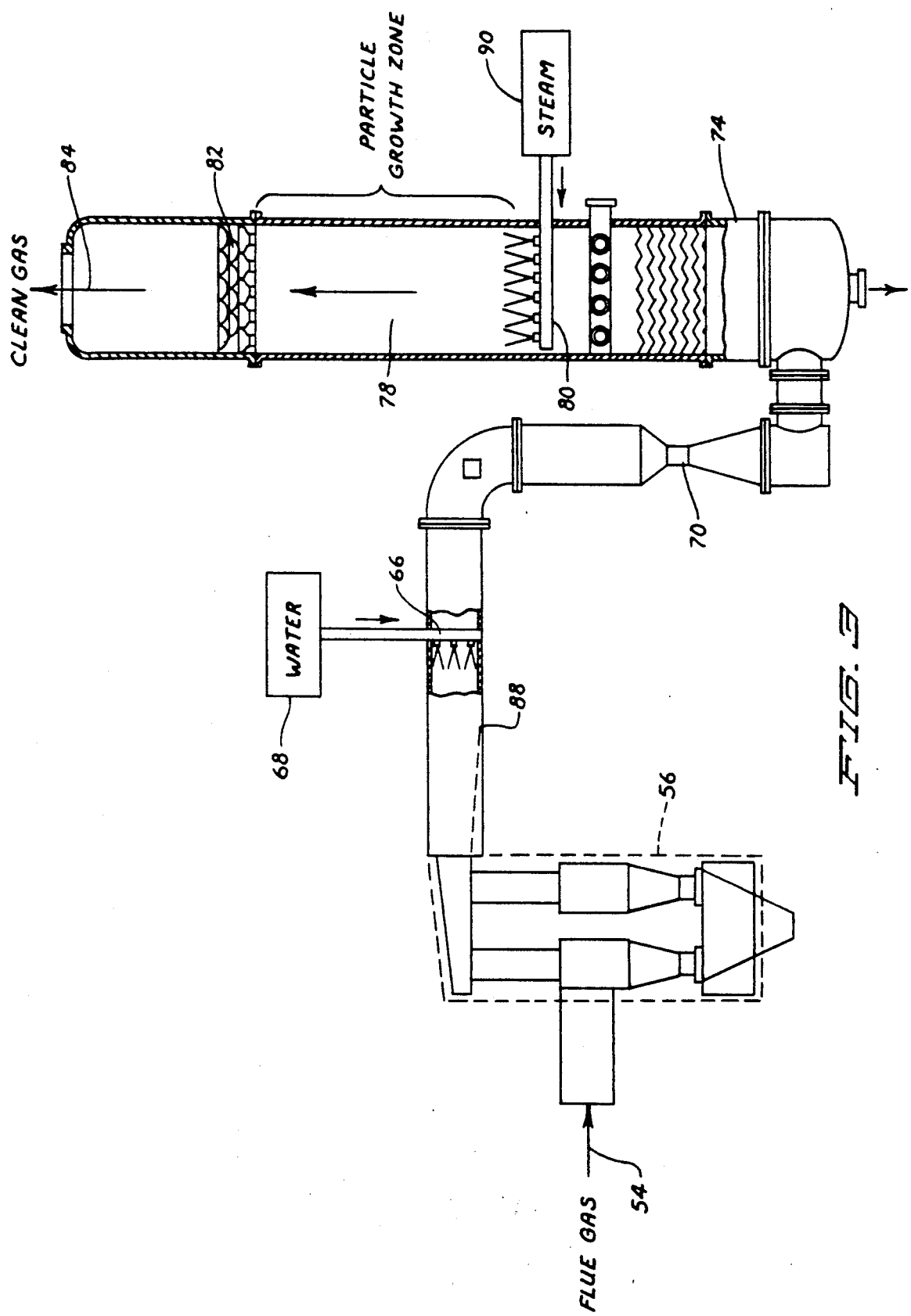
FIG. 3 is a schematic representation of a modified form of the structure shown in FIG. 2.

In FIG. 3, the modified form of the device of FIG. 2 is shown which does not include the waste heat recovery boiler. The conduit 88 connecting the cyclone 56 to the venturi scrubber 70 has a greater length than the conduit 64 of FIG. 2 and includes the water spray nozzle set 66, connected to a water source 68, to cool and humidify the gas. The venturi then brings the gas to its saturated state at 90° F. to 120° F. The high efficiency mist eliminator 82 will remove 90% or more of the particles, which are grown in the range of 0.8 to 1.2 microns in the particle growth chamber 78. In this form of the invention, a separate steam source 90 is provided for providing steam to the injection nozzle assembly 80. The arrangements shown in FIG. 2 and 3 can be used with other separators besides the mist eliminators illustrated, such as particle impactors. The mist eliminators work well with high water content particles.

Figure 5:
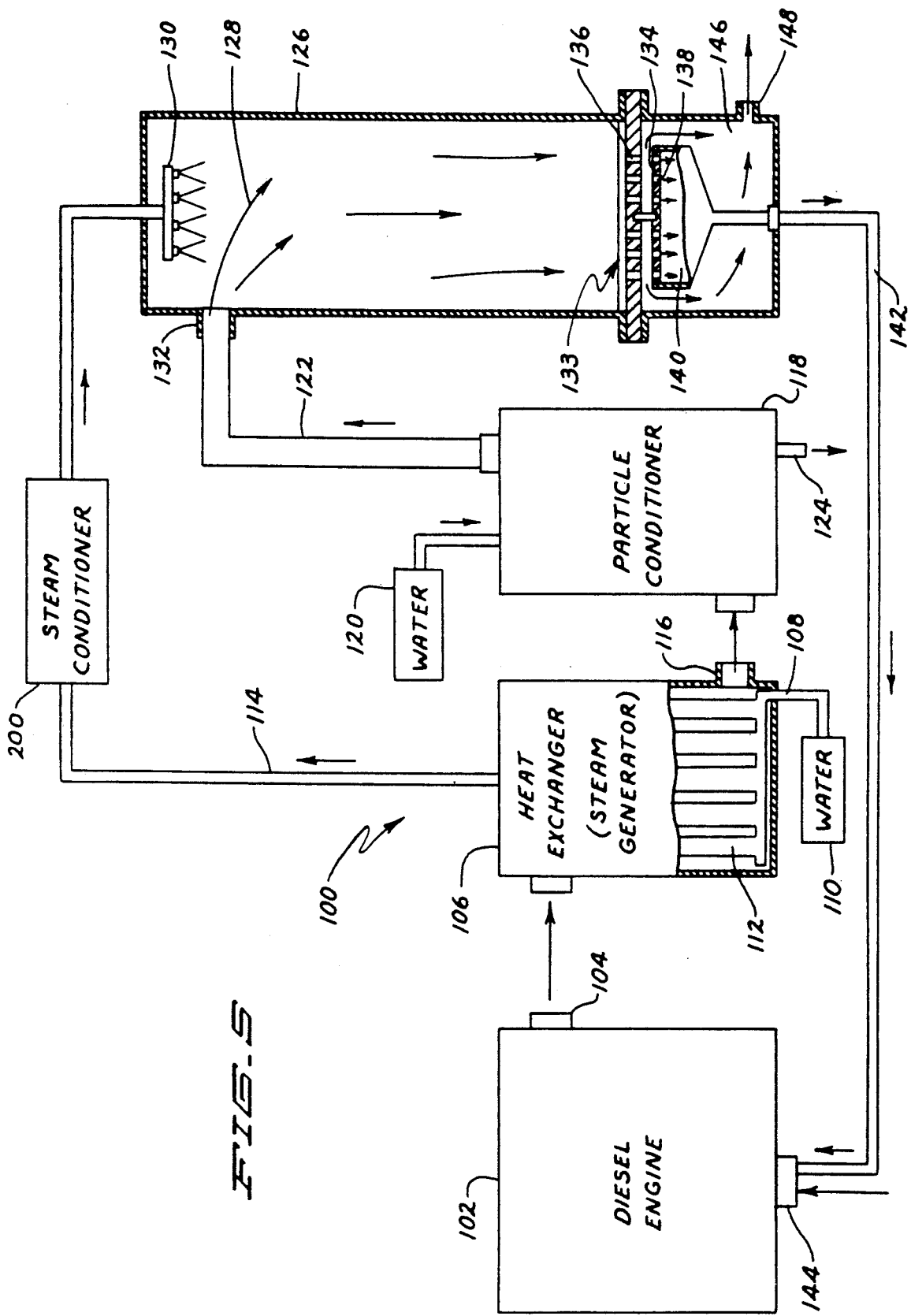
FIG. 5 is a schematic representation of an embodiment of the present invention used for recovering particles from diesel exhaust.

In FIG. 5, a modified form of the invention is illustrated for connection to a diesel engine to remove particulate matter from the exhaust gases from the diesel engine. The particle growth apparatus indicated generally at 100 comprises a particle growth device that is connected to a diesel engine illustrated schematically at 102. The diesel engine has an exhaust output 104, and the combustion exhaust gases, which are at high temperatures, are fed into a heat exchanger 106, again of conventional design, which has a water inlet 108 from a source of water 110. The water is circulated on the interior of the heat exchanger while the hot exhaust gases pass around the pipes indicated at 112 of the heat exchanger. Steam is exhausted through a steam conduit 114, and is used in a particle growth zone, as will be explained.

The combustion exhaust gases are discharged from the heat exchanger 106 through a conduit 116 into a particle conditioner 118. The particle conditioner 118 may be of the type previously shown where the cooling water from a source 120 is provided, and is sprayed into the gases for cooling. The exhaust gas is cooled in the conditioner 118. The cooling can optionally be done by a cooling jacket, or a water spray. The saturated flue gas exits through an output conduit 122. Waste water that is used in the particle conditioner can be exhausted through a drain 124. The saturated flue gas carries particles which can be of quite a wide range of sizes, unless a preselected particle remover treatment is carried out prior to entry into the particle conditioner. Most of the particles will be one micron and under.

The flue gases are carried into a housing 126 which defines an interior particle growth chamber 128. A steam spray bar 130 having suitable steam spray nozzles is positioned at the upper end of chamber 128, and the particles and flue gas entering through the entrance 132 will flow into the path of the steam and will move downwardly under engine exhaust back pressure and steam back pressure toward a virtual impactor or particle classifier 133. Virtual impactors are well known in the field, and high volume virtual impactors can be utilized in the present device to handle the volume of flow.

The virtual impactor 133 provides a nozzle plate 134. The large particles will be carried through the nozzles or opening 136. The large particles will also pass through nozzles 138 in the impactor plate into a chamber 140, with a "minor flow" of about 5% of the total flow. The larger particles remain suspended and are carried through a flow conduit 142 back into the air intake 144 of the diesel engine. The conduit 142 can be provided with a suitable orifice or valve to control the amount of flow through chamber 140 to approximately five percent of the total flow through the system, for providing inertial separation of the particles. The major flow, that is 95% of the exhaust flow, will be cleared of large particles and then exhausted out through an exhaust chamber or major flow chamber 146 and an outlet 148 to a filter.

Figure 6:
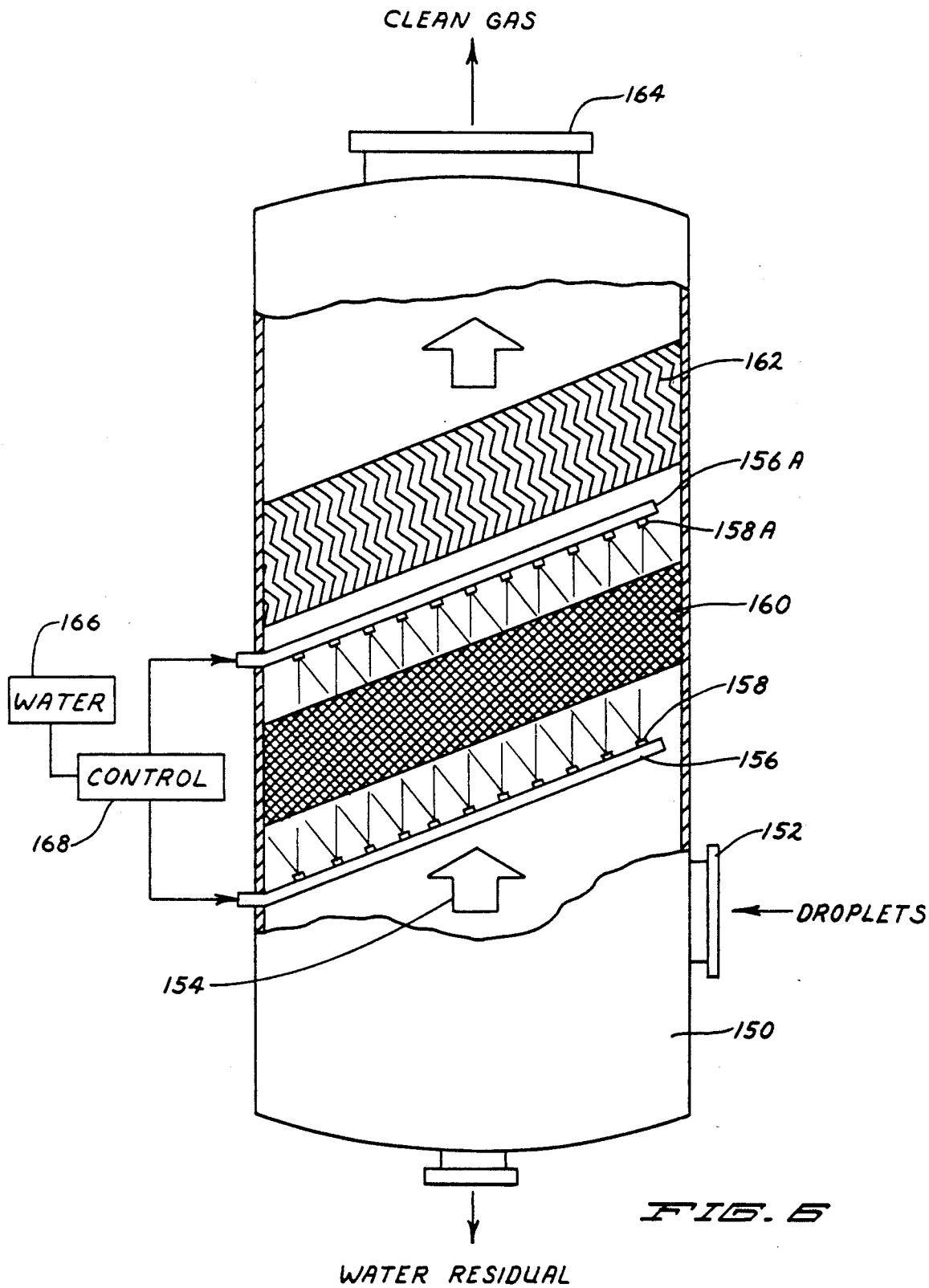
FIG. 6 is an illustration of a mist eliminator modified to include removal of solid particles recovered from diesel exhaust.
Figure 7:
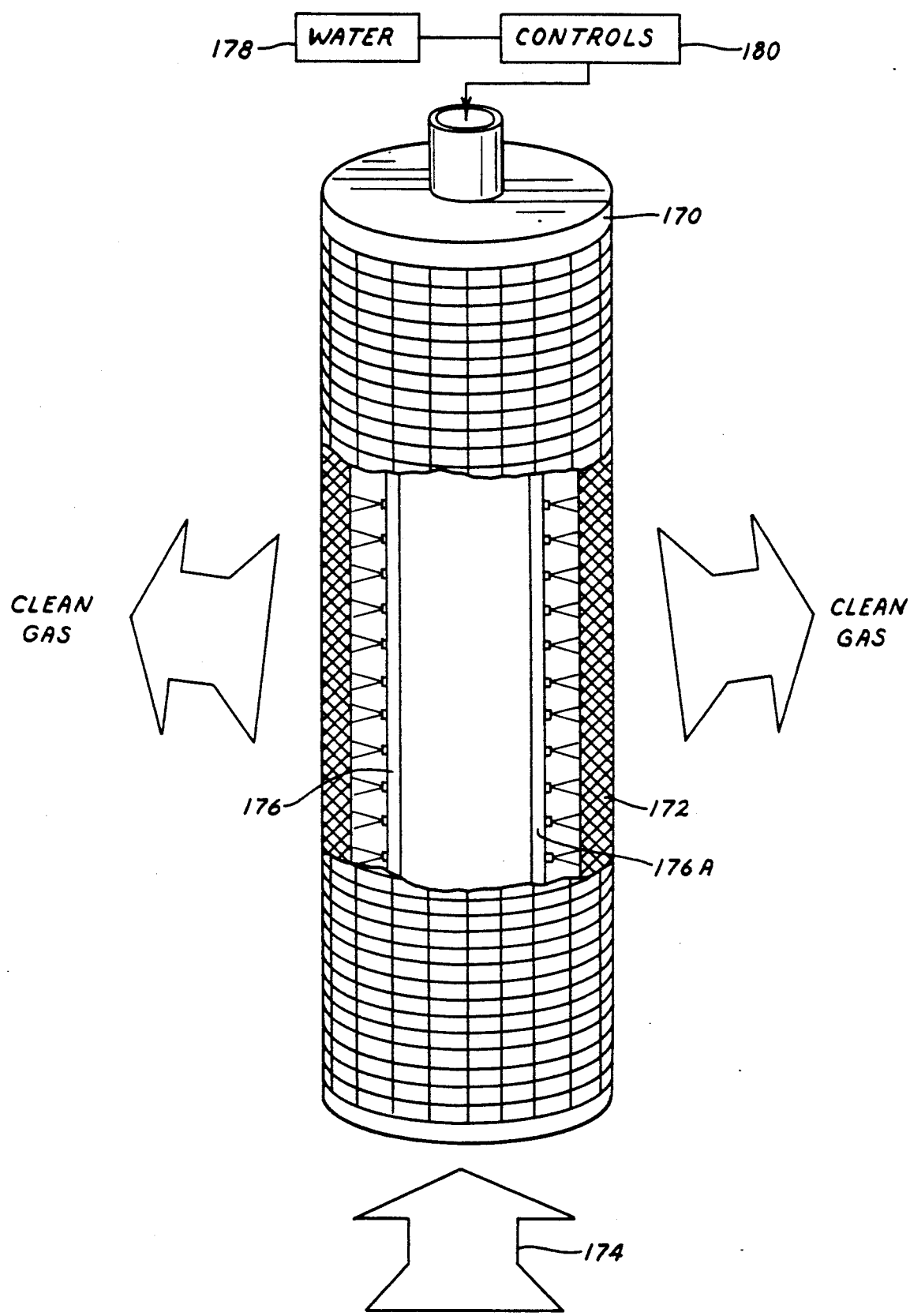
FIG. 7 is a schematic representation of a modified form of a mist eliminator used with the form of the present invention illustrated in FIG. 5.

The particles in conduit 142 comprise 90% to 95% of the particles that are grown or enlarged by condensation in the growth chamber. The particles in conduit 142 will be reburned in the diesel engine. The pressure for causing the overall exhaust flow can be provided by utilizing the exhaust back pressure for the impetus pressure because the particle growth system has a low pressure drop. The exhaust outlet of the diesel engine is passed into the cooling section to bring it to saturation at a low temperature and then into the particle growth zone. The gas is supersaturated by the injection of steam, as explained, to cause the growth of small particles by condensation on the cooler particles. Subsequent separation in the impactor or other particle classifier is easily done. No exhaust emissions are reduced by having treatment reduce the high temperatures of the exhaust prior to discharge.

Where the mist eliminators contain packing materials, as the standard mist eliminators do, and where solid particles tend to accumulate on the system, water scrubbers for removing particles can be utilized, as shown in FIG. 6. A mist eliminator 150 has an inlet 152 for receiving the gas carrying the enlarged particles. For example, such an inlet would be connected to the lower end of the growth chamber 128 in FIG. 5, and the virtual impactor would be replaced by the mist removing assembly 150. The flow of gas indicated by the arrow 154 is moving upwardly, past a water spray bar 156 having a number of nozzles 158 that directly spray onto a filter or packing medium 160 utilized in mist eliminators. A second spray bar on the opposite side of the packing 158, which is indicated at 156A has nozzles 158A that provide a wash in the opposite direction, to remove solid particles from the mist removing packing.

A vane-type mist eliminating stage 162 of the mist eliminator 150 receives the gases. The gases that have passed through the packing 160 then pass through this vane-type mist eliminating stage 162 and exit through an exit end 164 in a conventional manner. A suitable water source 166 can be provided to the spray bars 156 and 156A through suitable controls 168 that can pulse, vary the rate of flow, or continuously apply the spray to either one or the other of the spray bars 156 and 156A to provide for removal of the particles that form the nucleus of the grown particles having water (condensate) on the outside, or solid particles that are fairly large to avoid any plugging problems. The mist eliminator 150 has the fine mist from the grown particles collected on the first stage media. If further agglomeration or coagulation takes place, the larger droplets can be reentrained and removed at stage 162 when they would fall back against the gas flow direction, and then be drained off.

In FIG. 7, a conventional mist eliminator 170 is shown, which has high efficiency packing 172 for removing mist formed as a cylindrical tube, and wherein the aerosol carrying the grown particles is introduced in a lower end, it generally is indicated by the arrow 174 The mist eliminator 170 can be of the type made by Otto H. York Company, Inc., Parsippany, N.J., U.S.A., sold under the trademark "York-Fiberbed". The particles will pass from the interior outwardly through the walls of the packing 172, and spray bar assemblies 176 and 176A are provided, as shown, (there could be several spray bars spaced around the interior of the tube). The bars include nozzles to spray water from a source 178 under suitable controls indicated at 180 to continually wash down the packing surfaces. A suitable drain is provided at the exterior end. Clean gas is exhausted out through the side walls for disposal.

Thus, by providing means for conditioning the aerosol (gas plus particles) by cooling it and causing it to be in a saturated condition, and then introducing steam for supersaturation, the particle growth can be controlled at relatively low energy inputs. Condensation forms on particles in a supersaturated gas to cause particle growth that permits the particles to be easily separated.

Figure 9:
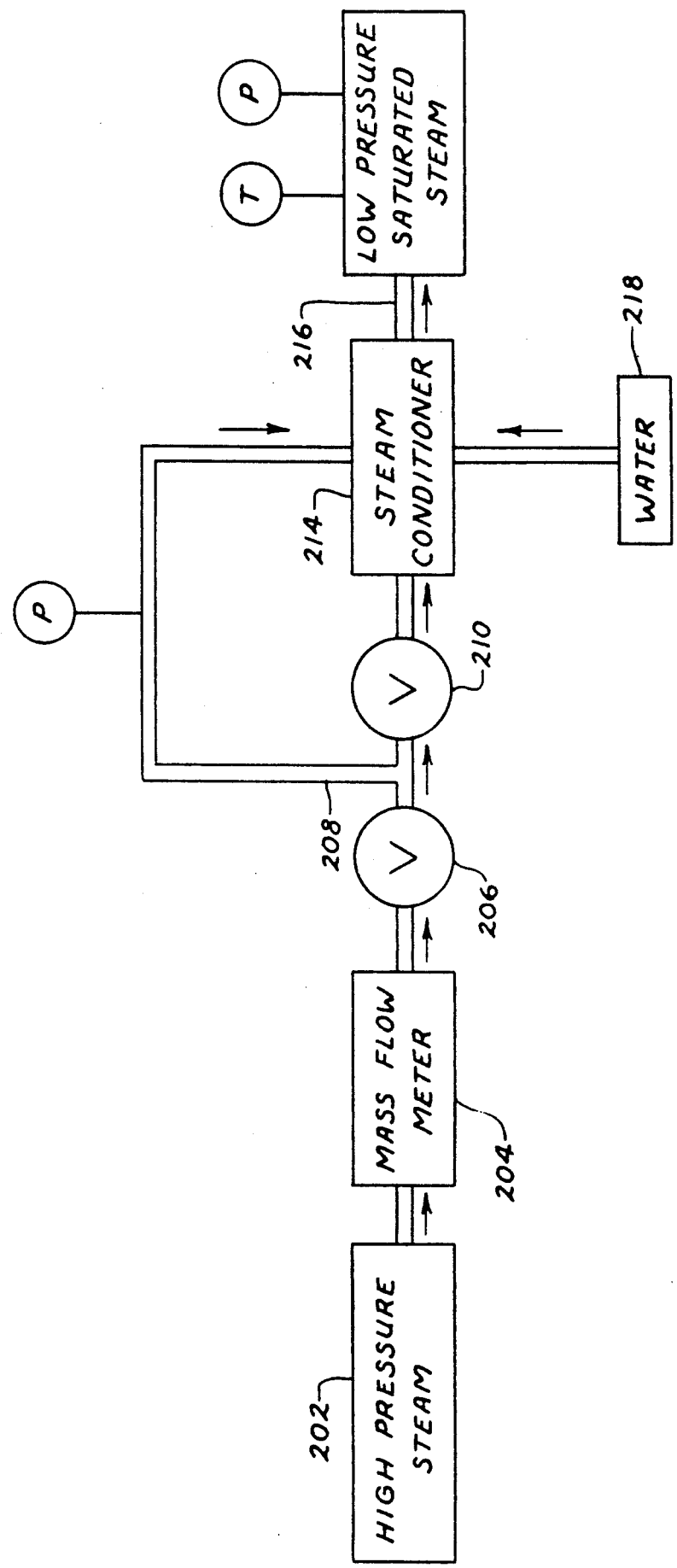
FIG. 9 is a detailed sectional view of a steam conditioner arrangement used with the system of FIG. 8.
Figure 9:
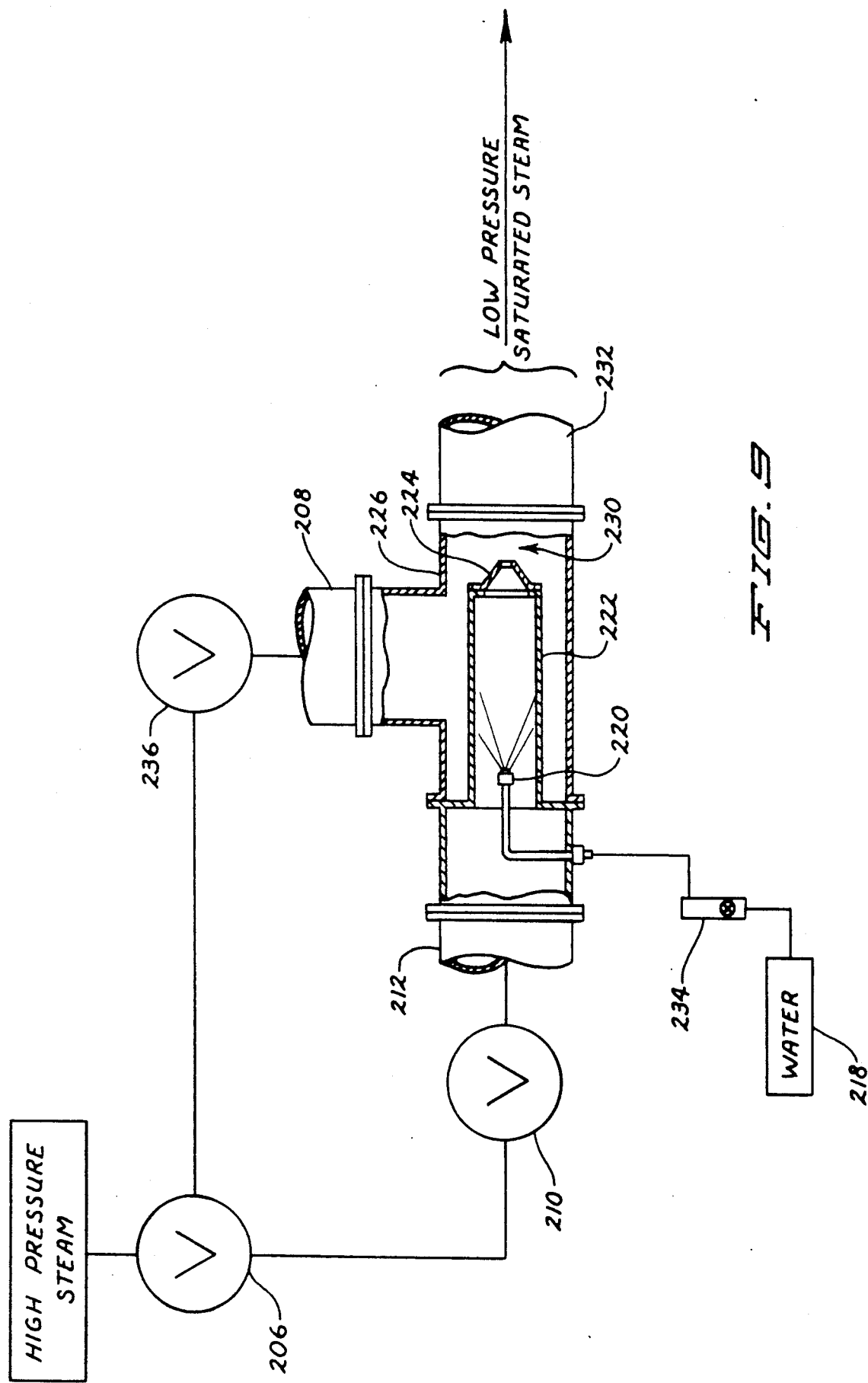

In the system of FIG. 5, the steam in conduit 114 can be passed through a steam conditioner indicated at 200, if desired. In FIGS. 8 and 9 such a steam conditioner is shown schematically in greater detail. High pressure steam, which can be the steam in conduit 114, is from a generally indicated source 202 is passed through a mass flowmeter 204, so that the volume of steam can be controlled. A valve 206 in conduit 208, regulates the flow of steam into a steam conditioning zone. The conduit 208 is the main steam flow conduit. Makeup steam can be provided through a valve 210 located in a branch steam line 212 leading to a steam conditioner housing 214. Valve 210 is normally throttled to minimize flow. Low pressure saturated steam is then exited out through a conduit 216. Temperature "T" and Pressure "P" of the low pressure saturated steam are monitored and controlled. Pressure in line 208 also is monitored and controlled.

A suitable water source 218 is used with the steam conditioner, in a manner shown in FIG. 9. The main high pressure steam line 208 is recombined with the smaller flow steam line entering the conditioner through the valve 210. Water is sprayed from the source 218 through a nozzle 220 into a solid wall housing 222 that carries the steam entering the conditioner through valve 210. The housing 222 has a nozzle outlet end 224. The housing 222 is mounted on the interior of a housing 226 that carries steam from the main high pressure steam line 208. The short pipe forming housing 222 permits water droplets that are too large to be carried by the steam to collect on the interior pipe surface, and the end nozzle 224 causes the steam to achieve a high velocity near sonic speed or the steam exits. The water injected flows along the pipe. The water flowing along the pipe 222 surface to the nozzle 224 reaches the nozzle, and it is formed off the surfaces in thin sheets as it exits the nozzle. The water then breaks up into a very fine mist, mixed with steam from conduit 212. This fine mist is mixed with the main steam flow in the region indicated at 230. The mist evaporates and brings the steam in the conduit 232 to proper saturation in a short distance.

The water from the source 218 is connected through a throttle valve 234 to regulate the water flow rate to a desired level, and the valves 206, 210 and an additional valve 236 in pipe 208 can be used for regulating the steam flow through the pipe 208 and thus through the steam conditioner to the desired level to provide properly conditioned, saturated steam at the desired flow rate and at a pressure slightly above ambient flue gas pressure into the flue gas stream to achieve supersaturation and particle growth by condensation, as described.

The energy used for small particle removal is minimized by taking advantage of the heat transfer characteristics of gas solids, so that after saturation the gas at temperatures of 80° F. to 90° F. (below 140° F. at least and preferably below 100° F.) and then injecting steam to achieve supersaturation condensation on the solid particles occurs to cause particle growth to micron are greater in diameter. Particles of this size can be more easily removed from the gas with equipment that operates with low power consumption.

Toxic particles and particles harmful to humans, such as heavy metals and water soluble gases present in flue gas, can be removed. Soot and oxides in diesel exhausting gases also can be removed.

Although the present invention has been described with reference to preferred embodiments, workers skilled in the art will recognize that changes may be made in form and detail without departing from the spirit and scope of the invention.

What is claimed is:

1. A method of separating submicron particles from an aerosol comprising the steps of;
    cooling the aerosol to condition it to a saturated state at a temperature below the temperature of steam;
    introducing steam into the aerosol after cooling the aerosol to supersaturate the aerosol with steam at a higher temperature than the aerosol and cause condensation to form on the particles permitting the submicron particles to grow to in range of 0.8 to 1.2 microns before removal the grown particles from the aerosol subsequent to supersaturating the gas by introducing steam; and
    removing the grown particles from the aerosol in a mist eliminator subsequent to supersaturating the gas by introducing steam.

2. The method of claim 1 including the step of providing for inertial separation of particles prior to the cooling of the aerosol.

3. The method of claim 1 wherein the step of cooling comprises introducing a water spray into the aerosol to reduce the temperature of the aerosol and to raise the aerosol to a saturated state.

4. The method of claim 1 wherein the step of cooling comprises cooling the aerosol not to be substantially greater than in the range of 140° F.

5. The method of claim 1 including the step of reducing particle number concentration prior to introducing steam by permitting particles to agglomerate.

6. The method of claim 1 including the step of passing the aerosol containing the particles grown by condensation of steam through a mist eliminator to remove such grown particles.

7. The method of claim 1 wherein the step of cooling the aerosol to a temperature of less than 100° F.

8. The method of claim 1 wherein the step of cooling comprises cooling the aerosol to a temperature between 90° to 120° F.

9. A method of separating submicron particles from an aerosol comprising the steps of;
    cooling the aerosol to condition it to a saturated state at a temperature below the temperature of steam;
    conditioning high pressure steam to be at a low pressure close to the ambient flue gas pressure prior to introducing the steam into the aerosol;
    introducing conditional low pressure steam into the aerosol after cooling the aerosol to supersaturate the aerosol with steam at a higher temperature than the aerosol and cause condensation to form on the particles; and
    removing the grown particles from the aerosol subsequent to supersaturating the gas by introducing steam.

10. Apparatus for condensation growth of small particles from a high temperature aerosol containing a gas and particles under one micron size in the gas comprising:
    means for separating substantial size particles above one micron in diameter from the aerosol;
    a coagulation passageway for permitting fine particle agglomeration;
    means for reducing the temperature of the aerosol subsequent to agglomeration and causing saturation of the aerosol connected to the coagulation passageway;

means for introducing steam at a higher temperature than the aerosol into the reduced temperature aerosol for supersaturation of the aerosol to a level to cause condensation growth on particles in the aerosol, the means for introducing steam including a steam conditioner connected to a high pressure steam source, the steam conditioner including a pressure reduction stage to reduce steam pressure prior to introducing the steam into the reduced temperature aerosol; and means for removing the particles grown in size by condensation from the aerosol.

11. The apparatus of claim 10 wherein the means for reducing the temperature of the aerosol includes means for spraying water into the aerosol.

12. The apparatus of claim 10 wherein the means for reducing the temperature of the aerosol comprises a heat exchanger for producing steam, and the means for introducing steam comprises means coupled to the heat exchanger for providing at least a portion of the steam introduced into the aerosol.

13. The apparatus of claim 10 wherein the means for removing the grown particles comprises a mist removing media through which the supersaturated aerosol passes.

14. The apparatus of claim 13 and means for providing a spray of water for back flushing the media to remove solid particles form the mist removing media.

15. The apparatus of claim 10 wherein the means for removing comprises a particle separator for classifying particles into a portion of particles below a selected size, the apparatus receiving an input from an internal combustion engine exhaust system, said internal combustion engine also having an intake and means connecting an output of the particle separator to the intake of the internal combustion engine.

* * * * *

UNITED STATES PATENT AND TRADEMARK OFFICE
CERTIFICATE OF CORRECTION

PATENT NO. : 5,176,723

DATED : January 5, 1993

INVENTOR(S) : BENJAMIN Y.H. LIU, PETER H. MCMURRY
JINJUN SUN

It is certified that error appears in the above-identified patent and that said Letters Patent is hereby corrected as shown below:

Col. 12, line 10, delete "form", insert "from'

Signed and Sealed this

Ninth Day of November, 1993

Attest:

BRUCE LEHMAN

*Attesting Officer*         Commissioner of Patents and Trademarks